(12) United States Patent
Peng et al.

(10) Patent No.: US 9,418,691 B2
(45) Date of Patent: Aug. 16, 2016

(54) HEAT ASSISTED MEDIA RECORDING APPARATUS WITH LASER DIODE MODE HOPPING SUPPRESSION

(71) Applicant: Seagate Technology LLC, Cupertino, CA (US)

(72) Inventors: Chubing Peng, Eden Prairie, MN (US); Xiaoyue Huang, Eden Prairie, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 14/691,226

(22) Filed: Apr. 20, 2015

(65) Prior Publication Data

US 2015/0340053 A1    Nov. 26, 2015

Related U.S. Application Data

(60) Provisional application No. 62/001,254, filed on May 21, 2014.

(51) Int. Cl.
| | |
|---|---|
| *G11B 5/00* | (2006.01) |
| *G11B 5/48* | (2006.01) |
| *G11B 11/00* | (2006.01) |
| *G11B 5/60* | (2006.01) |
| *G11B 13/08* | (2006.01) |
| *G11B 7/1384* | (2012.01) |
| *G11B 5/31* | (2006.01) |

(52) U.S. Cl.
CPC .......... *G11B 5/6088* (2013.01); *G11B 5/314* (2013.01); *G11B 5/4866* (2013.01); *G11B 7/1384* (2013.01); *G11B 13/08* (2013.01); *G11B 2005/001* (2013.01); *G11B 2005/0021* (2013.01)

(58) Field of Classification Search
CPC .............. G11B 5/4866; G11B 2005/0021; G11B 5/314; G11B 5/6088; G11B 2005/001; G11B 7/1387; G11B 5/3116; G11B 13/045; G11B 11/10554; G11B 11/1058; G11B 5/3133; G11B 13/08; G11B 7/1206; G11B 7/1384
USPC ................. 369/13.33, 13.13, 112.27
See application file for complete search history.

(56) References Cited

U.S. PATENT DOCUMENTS

| | | | | |
|---|---|---|---|---|
| 7,542,236 | B2* | 6/2009 | Ota ............... | G11B 5/4826 360/125.74 |
| 8,004,794 | B2* | 8/2011 | Zhou ............. | G11B 5/1278 360/125.12 |
| 8,164,987 | B2* | 4/2012 | Gill .............. | G11B 5/1278 369/112.27 |
| 8,451,696 | B2  | 5/2013 | Huang et al. | |
| 8,675,455 | B1* | 3/2014 | Krichevsky ..... | G11B 5/3133 360/59 |
| 8,837,071 | B2* | 9/2014 | Macken .......... | G11B 5/314 360/122 |

(Continued)

*Primary Examiner* — Ali Neyzari
(74) *Attorney, Agent, or Firm* — Hollingsworth Davis, LLC

(57) ABSTRACT

An apparatus includes a slider body, a laser diode, an optical path, and a heating element. The laser diode is configured to produce energy and is subject to temperature changes as a result of producing energy. The optical path within the slider body is configured to deliver the energy to heat a magnetic recording medium. The heating element is disposed along a length of the optical path within the slider body and is configured to control a temperature of the optical path to mitigate temperature-induced mode hopping of the laser diode.

20 Claims, 10 Drawing Sheets

(56) References Cited

U.S. PATENT DOCUMENTS

| | | | | |
|---|---|---|---|---|
| 8,873,350 B2 * | 10/2014 | Rausch | ............... | G11B 5/6088 369/112.27 |
| 8,891,340 B2 * | 11/2014 | Lennard | ............... | G11B 5/02 360/59 |
| 9,142,229 B2 * | 9/2015 | Kautzky | ............... | G11B 5/3133 |
| 9,202,499 B2 * | 12/2015 | Kiely | ............... | G11B 5/3116 |
| 2004/0184192 A1 | 9/2004 | Ota et al. | | |
| 2009/0052092 A1 | 2/2009 | Zhou et al. | | |
| 2012/0250178 A1 * | 10/2012 | Hirano | ............... | G11B 5/66 360/59 |
| 2014/0036645 A1 | 2/2014 | Leonard et al. | | |

* cited by examiner

HEAT ASSISTED MEDIA RECORDING APPARATUS WITH LASER DIODE MODE HOPPING SUPPRESSION

RELATED PATENT DOCUMENT

This application claims the benefit of Provisional Patent Application Ser. No. 62/001,254 filed on May 21, 2014, to which priority is claimed pursuant to 35 U.S.C. §119(e), and which is incorporated herein by reference in its entirety.

SUMMARY

Examples described herein include methods, apparatuses, and techniques related to heat-assisted media recording (HAMR). In one embodiment, an apparatus includes a slider body, a laser diode, an optical path, and a heating element. The laser diode is configured to produce energy and is subject to temperature changes as a result of producing energy. The optical path within the slider body is configured to deliver the energy to heat a magnetic recording medium. The heating element is disposed along a length of the optical path within the slider body and is configured to control a temperature of the optical path to mitigate temperature-induced mode hopping of the laser diode.

According to another embodiment, a method includes delivering energy via an optical path of a slider body to heat a magnetic recording medium, and heating the optical path with a heating element disposed along a length thereof to increase a temperature of the optical path and thereby mitigate temperature-induced mode hopping of the laser diode.

Another exemplary embodiment includes an apparatus with a slider body, a laser diode, and a heating element. The slider body comprises an optical path and a near field transducer. The near field transducer is in optical communication with the optical path. The laser diode is mounted to or proximate the slider body, is configured to produce energy, and is subject to temperature changes as the result of producing energy. The heating element is disposed along the optical path within the slider body and is configured to control a temperature of the optical path to mitigate temperature-induced mode hopping of the laser diode.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

This disclosure describes use of temperature control on one or both of a laser diode and a slider body to mitigate temperature-induced mode hopping of the laser diode used in heat-assisted magnetic recording (HAMR) devices. In particular, a heating element and/or a thermo-electric cooler/converter can be used to mitigate instances of power instability associated with laser diode mode hopping during HAMR. In HAMR devices, also sometimes referred to as thermal-assisted magnetic recording (TAMR) devices or energy assisted magnetic recording (EAMR), a magnetic recording medium (e.g., hard drive disk) is able to overcome superparamagnetic effects that limit the areal data density of typical magnetic media. In a HAMR recording device, information bits are recorded on a storage layer at elevated temperatures. The heated area in the storage layer determines the data bit dimension, and linear recording density is determined by the magnetic transitions between the data bits.

In order to achieve desired data density, a HAMR recording head (e.g., slider) includes optical components that direct light from a laser to the recording media. The HAMR media hotspot may need to be smaller than a half-wavelength of light available from current sources (e.g., laser diodes). Due to what is known as the diffraction limit, optical components cannot focus the light at this scale. One way to achieve tiny confined hot spots is to use an optical near field transducer (NFT), such as a plasmonic optical antenna. The NFT is designed to support local surface-plasmon at a designed light wavelength. At resonance, high electric field surrounds the NFT due to the collective oscillation of electrons in the metal. Part of the field will tunnel into a storage medium and get absorbed, raising the temperature of the medium locally for recording. During recording, a write element (e.g., write pole) applies a magnetic field to the heated portion of the medium. The heat lowers the magnetic coercivity of the media, allowing the applied field to change the magnetic orientation of heated portion. The magnetic orientation of the heated portion determines whether a one or a zero is recorded. By varying the magnetic field applied to the magnetic recording medium while it is moving, data is encoded onto the medium.

Figure 1A:
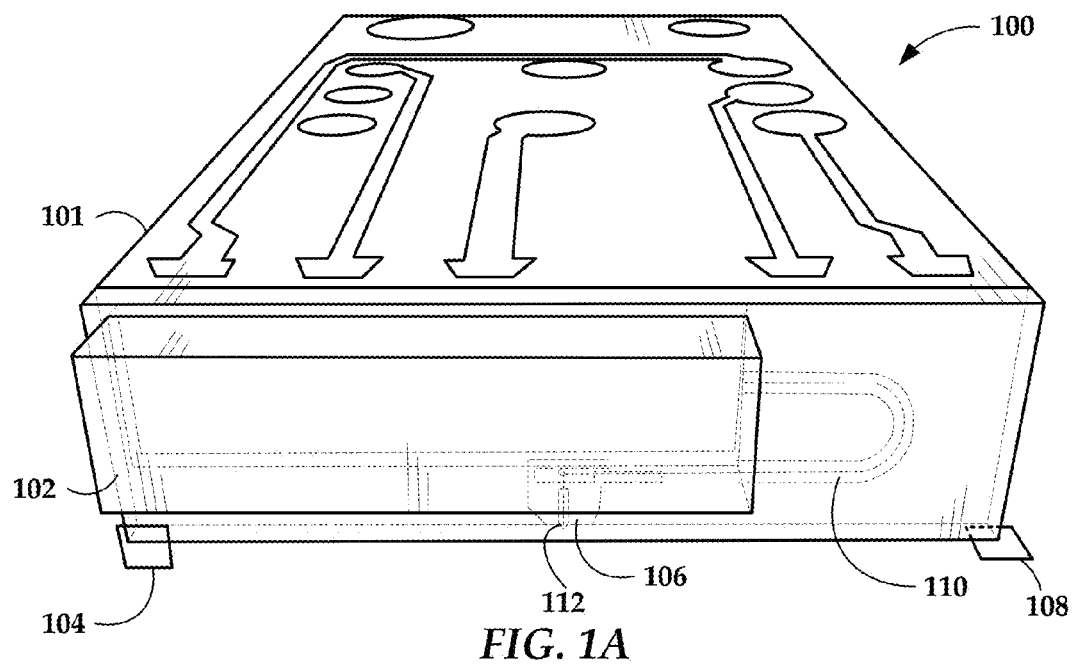
FIGS. 1A and 1B are perspective views of apparatuses according to example embodiments.

A HAMR drive uses a laser diode to heat the media to aid in the recording process. Due to inefficiencies of electric to optical power, the laser diode also heats itself during lasing. Components (writer, reader, heat elements) in the magnetic slider also dissipate heat and the heat is conducted to laser diode as the laser diode submount is mounted on the slider. To illustrate possible optical transmission paths, FIGS. 1 and 2 show perspective views of HAMR configurations according to example embodiments. In FIG. 1A, slider 100 has a laser-in-slider (LIS) configuration. In this configuration, slider 100 includes a slider body 101 having an edge-emitting laser diode 102 integrated into a trailing edge surface 104 of the slider body 101. In this example, the laser diode 102 is disposed within a cavity formed in the trailing edge surface 104. The laser diode 102 is proximate to a HAMR read/write element 106, which has one edge on an air bearing surface 108 of the slider 100. The air bearing surface 108 faces and is held proximate to a moving media surface (not shown) during device operation.

While here the read/write element 106 is shown as a single unit, this type of device may have a physically and electrically separate read element (e.g., magnetoresistive stack) and write element (e.g., a write coil and pole) that are located in the same general region of the slider 100. The separate read and write portion of the read/write element 106 may be separately controlled (e.g., having different signal lines, different head-to-media spacing control elements, etc.), although may share some common elements (e.g., common signal return path). It will be understood that the concepts described herein described relative to the read/write element 106 may be applicable to individual read or write portions thereof, and may be also applicable where multiple ones of the read write portions are used, e.g., two or more read elements, two or more write elements, etc.

The laser diode 102 provides electromagnetic energy to heat the media surface at a point near to the read/write element 106. Optical path components, such as a waveguide 110, are formed integrally within the slider 100 to deliver light from the laser diode 102 to the media. In particular, a local waveguide and NFT 112 may be located proximate the read/write element 106 to provide local heating of the media during write operations.

Various components (e.g., 106, 112, including the laser diode 102) may also experience significant heating due to light absorption and electric-to-optical conversion inefficiencies as energy produced by the laser diode 102 is delivered to the magnetic recording medium (not shown). During write operation, these light absorption and inefficiencies will vary the junction temperature of the laser diode, causing a shift in laser emission wavelength, leading to a change of optical feedback from optical path in slider to the cavity of the laser diode 102, a phenomenon that is known to lead to mode hopping/power instability of the laser diode 102. Mode hopping is particularly problematic in the context of single-frequency lasers. Under some external influences, a single-frequency laser may operate on one resonator mode (e.g., produce energy with a first wavelength) for some time, but then suddenly switch to another mode (produce energy with a second wavelength) performing "mode hopping." It is thought that mode hopping is caused by a temperature induced change in external optical feedback, mainly due to the shift in gain peak wavelength from a change in band gap with temperature. Temperature induced changes in the index of refraction and the thermal expansion of the materials that form the laser cavity can also contribute to mode hopping. Both of these cause the mode wavelength to increase but the contribution from the latter, typically 0.06 nm/K, is much smaller than the peak gain shift, typically 0.25 nm/K. As the temperature at the laser diode junction increases, the gain peak will overtake the modes leading to mode hopping.

Mode hopping is problematic for HAMR applications, as mode hopping leads to laser output power jumping and magnetic transition shifting from one block of data to another. Large transition shifts in a block of data cannot be recovered in channel decoding, resulting in error bits.

Figure 1B:
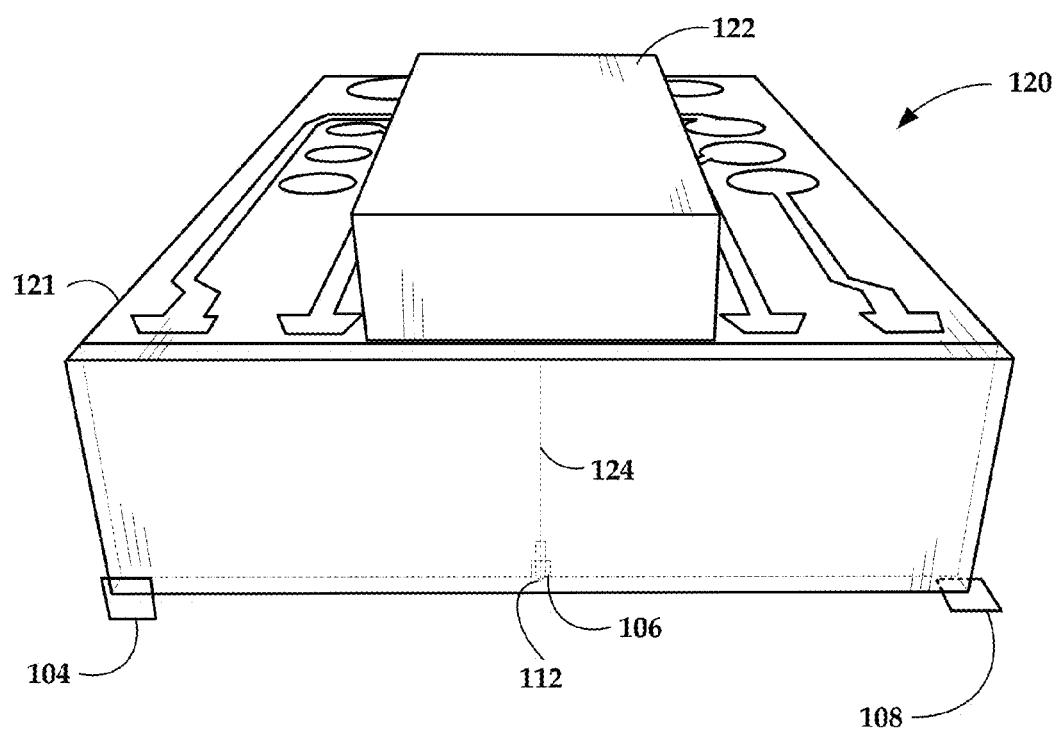
Figure 2:
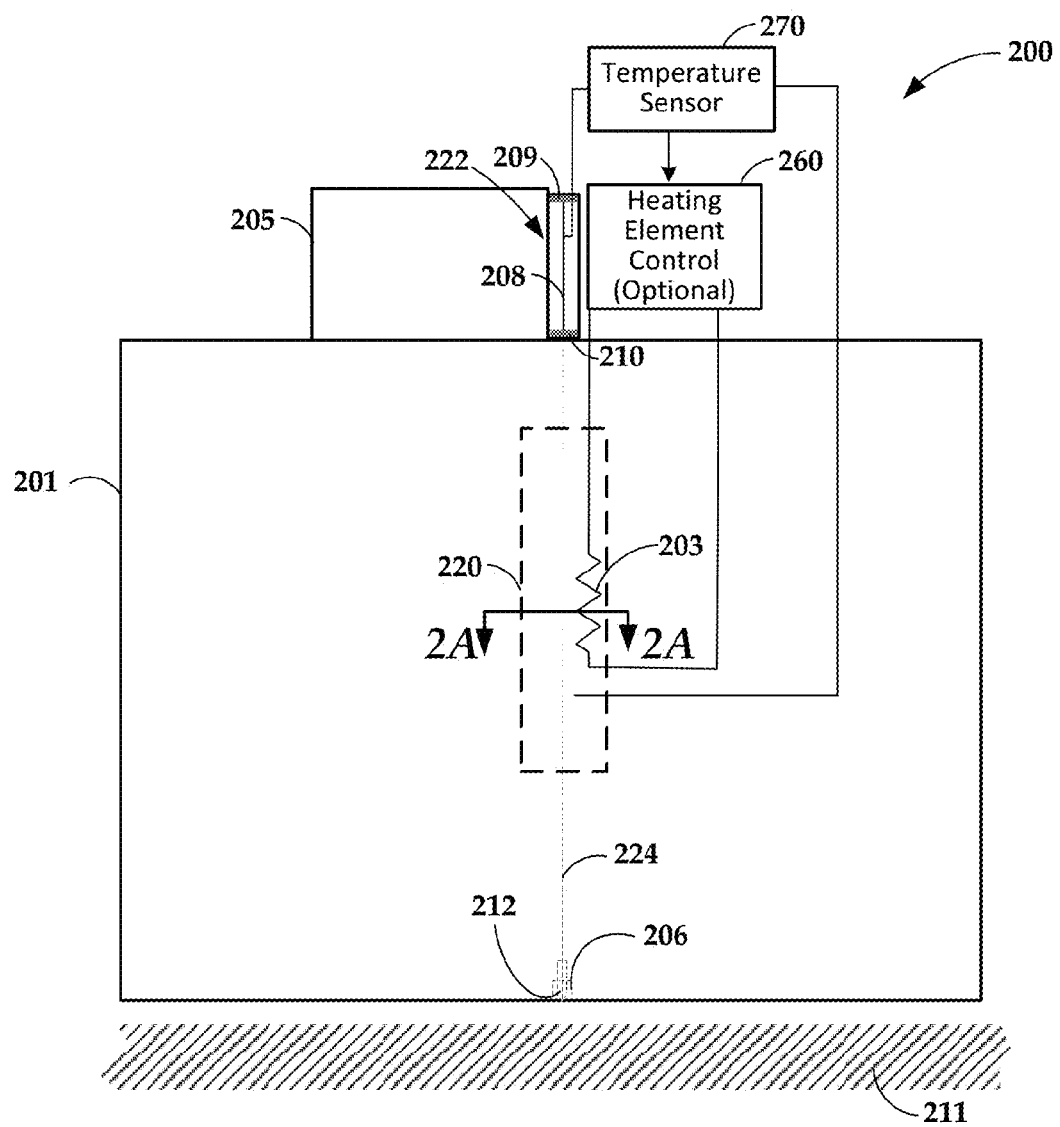
FIG. 2 is a plan view of an apparatus and related components according to a first example embodiment.

In FIG. 1B, a laser-on-slider (LOS) configuration 120 is illustrated. This example includes a laser diode 122 that is mounted on a top surface of a slider body 121. The laser diode 122 is coupled to an optical path of the slider body 121 that includes, among other things, an optical path 124 (e.g., a straight waveguide). In this configuration, the laser diode 122 may also be edge-emitting, such that the light is emitted from the laser diode 122. In order to direct the light towards the air bearing surface 108, the laser diode 122 (or other component) may include optical path elements such as a mirror (not shown) that redirects the light emitted from the laser diode 122 towards the air bearing surface 108. In other configurations, an edge-emitting, top-mounted laser diode may be oriented so that the light emitted directly downwards toward the air bearing surface 108. This may involve placing the laser diode 122 on a submount (not shown) on the top of the slider body 121, the submount orienting the laser output in the desired direction.

While other components shown in FIG. 1B, such as the NFT 112 and read/write element 106 are referenced using the same numbers as FIG. 1A, the physical configuration of these and other components may differ in the different slider arrangements, e.g., due to the differences in optical coupling pathways, materials, laser power, etc. However, similar to the configuration shown in FIG. 1A, the laser diode 122 may experience mode hopping due to writing-induced temperature changes and due to return light (i.e. reflections back into light source) from the light path as well as from the magnetic recording medium.

While not illustrated explicitly in FIGS. 1A and 1B, slider configurations may utilize different types of semiconductor laser diodes, such as lasers having a Fabry-Perot laser diode cavity, a distributed Bragg reflector (DBR) laser, and a distributed feedback (DFB) laser. The embodiments described below may be applicable to a variety of energy delivery configurations and laser diode types.

FIG. 2 illustrates an apparatus 200 that utilizes a heating element 203 in, at or adjacent to an optical path 224 within the slider body 201 to heat the optical path 224 in order to compensate for the temperature-induced change in optical phase of return light, thereby mitigating mode hopping of the laser diode 222.

In the embodiment of FIG. 2, the laser diode 222 is illustrated disposed proximate to (e.g., mounted to) a submount 205 and slider body 201 in an LOS configuration. The laser diode resonator may use Fabry-Perot (FP), distributed feedback (DFB), or distributed Bragg reflector (DBR). The laser diode 222 configured with a Fabry-Perot cavity in FIG. 2 includes a gain medium 208 (also referred to as a junction or active region), a rear facet 209, and a front facet 210. As discussed previously, the optical path 224 (e.g., waveguide) extends through the slider body 201 and is configured to deliver energy produced by the laser diode 222 to a magnetic recording medium 211. An NFT 212 may be disposed in the optical path 224 and located proximate a read/write element 206 (e.g., a writer) to provide local heating of the magnetic recording medium 211 during write operations.

The heating element 203 extends along a length of the optical path 224 and creates a heated region 220 within the slider body 201. This heated region 220 encompasses a portion of the optical path 224. As will be discussed subsequently, the heating element 203 is configured to increase a temperature of the optical path to mitigate temperature-induced mode hopping of the laser diode 222. Mitigation is achieved by reducing (e.g., minimizing) variation in feedback phase to the laser diode 222.

Figure 2A:
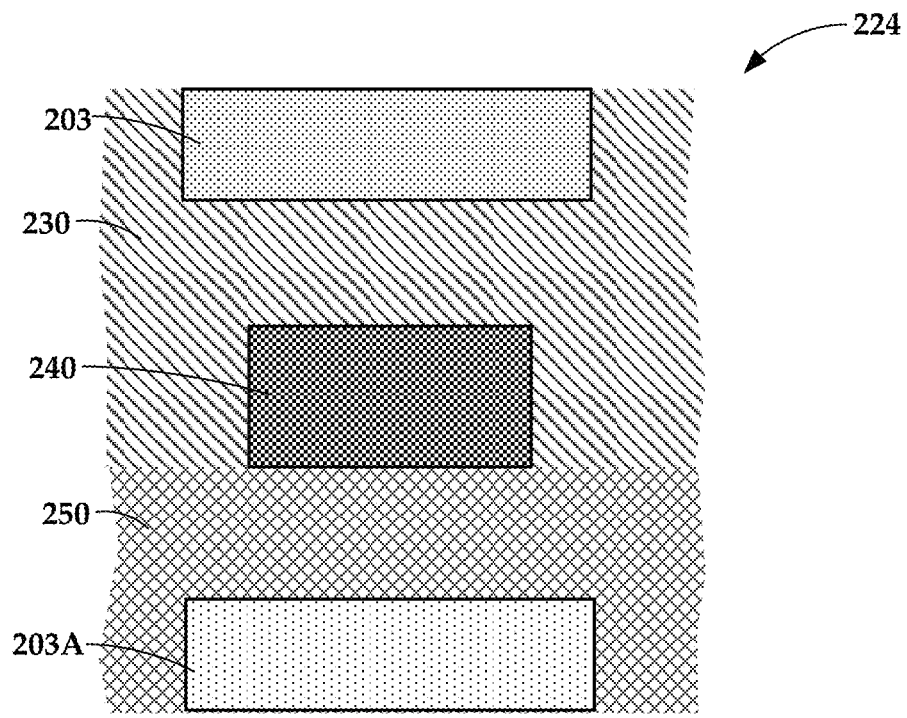
FIG. 2A is an enlargement of a portion of a slider body from FIG. 2 illustrating a configuration and disposition of a heating element according to one embodiment.

FIGS. 2 and 2A illustrate a configuration and disposition of the heating element 203 relative to components of the optical path 224. As illustrated in FIG. 2A, the heating element 203 can comprise a metallic wire of, for example, tungsten, TiN, etc. In the embodiment of FIGS. 2 and 2A, the heating element 203 has a substantially straight extent relative to the optical path 224. As illustrated in FIG. 2A, the heating element 203 can be disposed in a cladding layer such as top cladding layer 230 of optical path 224. Thus, the heating element 203 is spaced from a core 240 of the optical path 224. As illustrated in FIG. 2A, a second heating element 203A can be disposed in a bottom cladding layer 250 of the optical path 224 in addition to or in alternative to the heating element 203. Other heating element configurations are contemplated, such as a unitary heating element that provides heat to multiple portions of the optical path 224 (e.g., the top cladding layer 230 and the bottom cladding layer 250). Thus, the heating element 203 can be disposed above and/or below the core 240. The heating element 203 can be spaced from the core 240 to reduce (e.g., minimize) light propagation loss due to light absorption in the heating element 203, at a distance greater than $$\frac{\lambda_0}{2\pi\sqrt{n_{core}^2 - n_{clad}^2}},$$

where $\lambda_0$ denotes light wavelength in vacuum, $n_{core}$ ($n_{clad}$) is the index of refraction of the core (cladding). However, heating element 203 can be placed sufficiently close to the core 240 to reduce or minimize the electric power needed to provide desired heating of the core 240.

As illustrated in FIG. 2, the heating element 203 can be provided with active control from a controller 260 to vary, for example, the amount of electric current passed through the heating element. A sensor 270 can be utilized to monitor one or more temperatures (e.g., a junction temperature of the laser diode 222, a temperature within or adjacent the core 240 in the heated region 220). Data representing the temperature(s) collected by the sensor 270 can be provided to the controller 260 in order to vary the amount of heating as desired.

As the laser diode 222 is illustrated with the Fabry-Perot laser diode cavity in FIG. 2, the laser diode 222 is comprised in part of the two facets 209, 210 and the gain medium 208. According to an exemplary embodiment that will be discussed in reference to FIG. 2 and the following Equations 1-8b, the rear facet 209 can be coated with layers of quarter-wave thick dielectric materials of high and low indices of refraction alternatively, which provides high reflection, for instance, at or above 95% in reflectivity as desired. The front facet 210 can also be coated with a few layers of dielectric materials for desired performance such as light output, durability, etc. A Fabry-Perot cavity laser usually supports many longitudinal modes, and the frequency of a mode is determined by the phase condition. The mode with highest net gain (gain from the gain medium subtracts the loss in the cavity) will lase. In the following analysis, the reflection coefficient into the cavity is referred to as $r_1$ from the rear facet 209 and $r_2$ from the front facet 210. The cavity can have a length (referred to in the following equations as La) between facets 209, 210, and the waveguide mode in the cavity has effective mode index $\bar{n}_a$. The reflection from the optical path 224 and the magnetic recording medium 211 can be simplified as an effective mirror of reflection coefficient $r_3$. The external light path (including optical path 224 through slider body) has propagation constant $\beta_e$ and is $L_e$ long. Since the wavelength shift in practical operation is only a few nm, the amplitude of $r_3$ can be approximated as a constant but its phase may vary significantly with slight change in lasing wavelength.

During magnetic recording, the laser diode 222 is modulated by an injection current: high current is used during writing on a data sector and low current (near or below lasing threshold) is used during servo zone to prevent servo marks being erased. Due to internal material loss in the laser cavity, some of light is absorbed in the cavity and turns into nonradiative heat. This dissipated heat in the cavity raises the temperature in the junction resulting in gain peak shift (due to conduction-valence band gap shift) as well as change in refractive index from thermal-optic coupling. The change of junction temperature with time causes the drift in lasing oscillation frequency, changing the optical phase in the slider optical path and therefore the feedback into the laser cavity. These changes can result in fluctuations in optical output power, in particular, power jumping if longitudinal mode hopping occurs. Additionally, return light may also cause transversal mode hopping if strip width of laser diode cavity is wide.

A steady state model can be used to analyze the laser cavity in the presence of external optical feedback during pulsing. Using the steady-state effective cavity model, the reflection coefficient from front facet $r_2$ is replaced by effective reflection coefficient, $r_{2eff}$, for a solitary cavity. Thus, Equation 1 describes the steady-state effective cavity model:

$$\frac{r_{2eff}}{r_2} = 1 + \left\{\frac{1-r_2^2}{r_2}r_3\right\}\frac{e^{j2\beta_e L_e}}{1+r_2r_3 e^{j2\beta_e L_e}} \quad (1)$$

At lasing threshold, gain G is equal to loss $\Gamma_0$ and can be described by Equation 2:

$$G = v_g\left[\alpha_i + \frac{1}{L_a}\ln\left|\frac{1}{r_1 r_{2eff}}\right|\right] \quad (2)$$

where $v_g$ denotes light group velocity in the laser cavity.

The change in gain, $\Delta G$, due to the change in the front facet reflection from optical feedback, can be written as Equation 3:

$$\Delta G = -\frac{2}{\tau_L}\ln\left|\frac{r_{2eff}}{r_2}\right| \quad (3)$$

where $\tau_L$ is light round-trip time in cavity:

$$\tau_L = \frac{2L_a}{v_g}.$$

The phase condition to determine the lasing frequency is given according to Equation 4:

$$(\phi_1 + \phi_{2eff}) + 2\frac{\omega}{c}\bar{n}_a L_a = 2m\pi \quad (4)$$

where $\phi_1$($\phi_{2\,eff}$) denotes the phase in the reflection from cavity back (front) facet and $\omega$ is the lasing (angular) frequency. Note that the mode index of cavity $\bar{n}_a$ is a function of angular frequency $\omega$, carrier density N in the gain material, and temperature T of the cavity. Thus, $\bar{n}_a = \bar{n}_a(\omega, N, T)$. The frequency shift due to external feedback and cavity temperature change is determined as given by Equation 5:

$$\phi\left(\frac{\phi_{2eff}}{\phi_2}\right) + 2\Delta\left(\frac{\omega}{c}\bar{n}_a L_a\right) = 0 \quad (5)$$

In Equation 5, c is the light velocity in a vacuum, and the change in back facet reflection is neglected because the laser diode 222 is assumed to be a Fabry-Perot laser and the wavelength shift is small. In a Distributed Bragg Reflector (DBR) type laser, the change in back reflection needs taken into account, which contributes to the change in both gain and phase.

By using Taylor expansion, we can obtain the change in frequency, $\Delta\omega$, due to external feedback and temperature change according to Equation 6:

$$\Delta\omega = \frac{1}{2}\alpha\Delta G - \frac{1}{\tau_L}\phi\left(\frac{r_{2eff}}{r_2}\right) - \frac{\omega_r}{n_g}\frac{\partial \bar{n}_a}{\partial T}\bigg|_r \Delta T \quad (6)$$

where $\alpha$ denotes the line-width enhancement factor, which is originated from the carrier induced change in the refractive index of the active layer. The last term on the right side of Eq. (6) comes from the temperature change induced frequency shift through the thermal-optical coupling coefficient, $$\frac{\partial \bar{n}_a}{\partial T},$$

r is a reference point where the temperature is referenced to.

For a semiconductor laser, temperature change also causes band gap shift through peak gain shift, which is actually dominated over the thermal-optical coupling. As such, Equation 6 can be rewritten as Equation 7 as follows:

$$(\Delta\lambda)_T = \Delta\lambda + \frac{\lambda_r}{\omega_r}\left[\frac{1}{2}\alpha\Delta G - \frac{1}{\tau_L}\phi\left(\frac{r_{2eff}}{r_2}\right)\right] \quad (7)$$

where $(\Delta\lambda)_T$ denotes the wavelength shift due to the change in temperature, and $\Delta\lambda$ is net change in wavelength due to the change in temperature and external optical feedback. There may be multiple solutions in Equation 7. For weak feedback, low $\Delta G$ (see Equation 3) selects the lasing frequency.

According to Equations 3 and 7 above, external optical feedback is determined by the optical phase, $\omega\tau_{ext}=2\beta_e L_e$. Here, $\tau_{ext}$ is light round-trip time in the light path. Thus, according to Equations 3 and 7 for one light path where, $\tau_{ext}=6.16$ ps, $\omega\tau_{ext}=(2.226\times10^3)\times2\pi$ at wavelength $\lambda=0.83$ µm, and the external mode spacing in wavelength is $$(\Delta\lambda)_{ext} = \frac{\lambda^2}{c\tau_{ext}} = 0.37 \text{ nm}.$$

As the change in wavelength is 0.37/2=0.18 nm, the gain change $\Delta G$ will be from peak to valley, which may induce longitudinal mode hopping, resulting in laser output power jumping. For quantum-well (QW) semiconductor laser, $(\Delta\lambda)_T=0.25$-$0.30$ nm/K. This means that the peak-to-valley change in $\Delta G$ requires only a change in junction temperature by about 0.6 K, which can be reached in HAMR as laser pulses.

As a further example, consider a weak optical feedback scenario where $|r_3|\ll b$. Neglecting multiple-reflection in the external light path, the gain change and the wavelength shift can be written:

$$\Delta G = -2\kappa\cos(\omega\tau_{ext}) \quad (8a)$$

$$(\Delta\lambda)_T = \Delta\lambda - \frac{\lambda_r}{\omega_r}\sqrt{1+\alpha^2}\,\kappa\sin(\omega\tau_{ext}+\tan^{-1}\alpha) \quad (8b)$$

where $\kappa$ denotes the coupling coefficient:

$$\kappa = \left[\frac{1-|r_2|^2}{|r_2|}|r_3|\right]\frac{1}{\tau_L}.$$

According to Equations 8a and 8b, if the external phase $\omega\tau_{ext}$ does not change with the change in temperature, the net shift in wavelength $\Delta\lambda$ will follow $(\Delta\lambda)_T$ and the change in gain $\Delta G$ due to external optical feedback will be kept substantially constant. Therefore, all cavity longitudinal modes will not see the change due to external optical feedback as temperature varies. For a laser cavity, due to spectral hole burning, the laser cavity is usually single-mode dominated. By optimizing the writing current at the pulse start, the lasing mode will fall in the valley in $\Delta G$, which renders stable laser output. The change in round trip phase can be represented as:

$$\Delta\omega\tau_{ext} = -\frac{\omega}{\lambda}(\Delta\lambda)_T\tau_{ext}.$$

For the optical path 224 shown in FIGS. 2A and 2B, if the height of the slider body 201 comprises $L_e=180$ µm, then optical path 224 has round-trip time of ~2.11 ps. This calculation assumes $(\Delta\lambda)_T=0.25$ nm/K, $\lambda=0.83$ µm, and $\Delta\omega\tau_{ext}=-0.47\ \pi$/K. To compensate the change in optical phase, the heating element 203 can be disposed above and/or below the optical path 224, as previously described in reference to FIGS. 2 and 2A. The change in round-trip phase through thermal-optical coupling is:

$$\Delta\phi = \frac{4\pi}{\lambda}\left[\frac{d\bar{n}_e}{dT}\Delta T\right]L_e.$$

Here $\bar{n}_e$ denotes the effective mode index of the light path. Typically, $$\frac{d\bar{n}_e}{dT} \sim 1\times10^{-4} K^{-1},$$

for heating element length=100 µm, $\Delta\phi=0.048\pi\times\Delta T=0.96\pi$ if $\Delta T=20$ K, which could compensate for a 2K change in junction temperature-induced wavelength shift.

Figure 3:
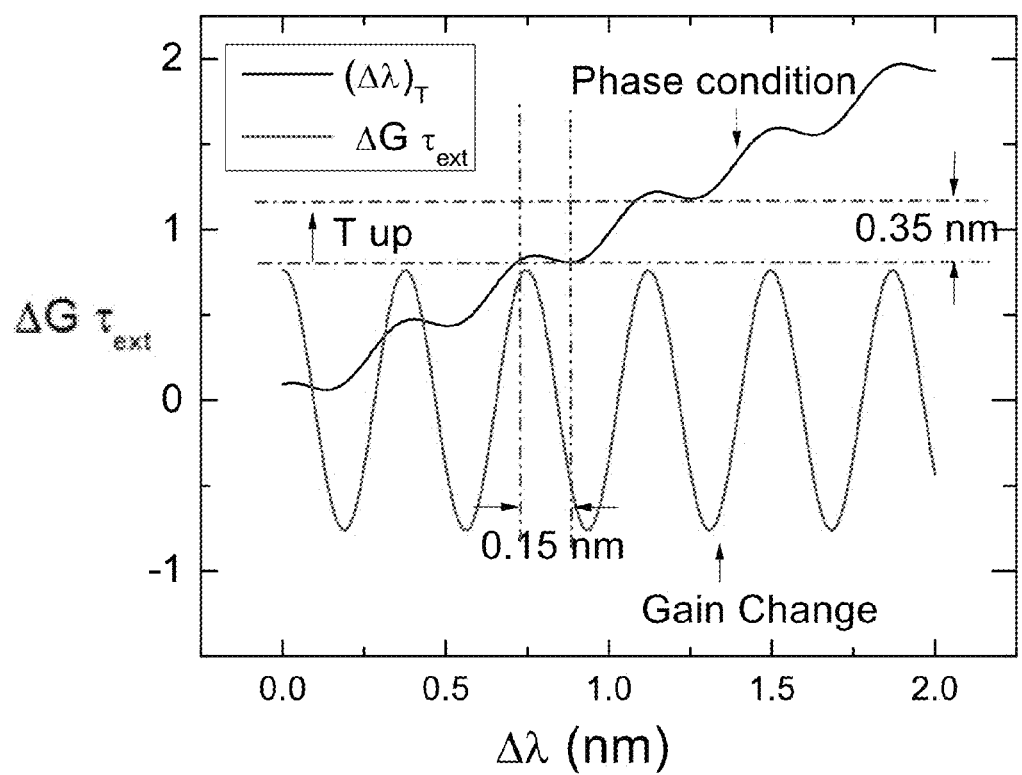
FIG. 3 is a graph showing a relationship of gain change and wavelength shift according to an example embodiment.

FIG. 3 illustrates a graph of both $(\Delta\lambda)_T$ and $\Delta G\tau_{ext}$ as a function of $\Delta\lambda$. Another parameter describing the external feedback-cavity coupling is the C factor: $C=\sqrt{1+\alpha^2}\kappa\tau_{ext}$. In the modeling that produced FIG. 3, a 12% reflection from front facet, $|r_2|=\sqrt{0.12}=0.346$; 10% external optical feedback, $|r_3|=\sqrt{0.10}=0.316$; round-trip time in laser cavity $\tau_L=13$ ps for $L_a=500$ µm long cavity; round-trip time in light path, $\tau_{ext}$=6.16 ps; the linewidth enhancement factor $\alpha$=4 assumed or calculated. As a result of these assumptions and calculations, C=1.57. A comparison can be made to the relative gain variation. Assuming a 95% reflection from the back facet, $|r_1|=\sqrt{0.95}=0.975$, group mode index $n_g$=3.9, internal material loss $\alpha_i$=5 cm$^{-1}$, the threshold gain without feedback, $G_r$=0.20×10$^{12}$ s$^{-1}$ is obtained.

The possible solution for $\Delta\lambda$ in Equation 7 is graphically represented in FIG. 3 as the cross point between the horizontal dash-dot line and the curve for phase condition. As expected, for C>1, there may be multiple solutions in $\Delta\lambda$. With increasing temperature, the horizontal line moves up. At the position shown in FIG. 3, there are two cross points. The left point is nearly at the $\Delta$G peak, while the right point is nearly at $\Delta$G valley. The lasing frequency will jump from the left to the right point. At this jump, $\Delta G/G_r$ reaches ~100%, which causes a large laser power output jump and therefore, results in a significant shift in magnetic transition. At this position, the lasing will be stable for a while. With further increasing temperature, large laser power output jumps will occur again. It should be noted that the change in wavelength $(\Delta\lambda)_T$ between two jumps is only about 0.35 nm, which corresponds to 1.2 K in the change of junction temperature if wavelength shift $(\Delta\lambda)_T$=0.30 nm/K (an amount typical for a semiconductor laser). This means that if the junction temperature varies by 1.2 K, at least one laser output power jump might occur. However, as discussed with reference to FIGS. 2 and 2A, such a power jump can be avoided (or the likelihood substantially reduced) by utilizing the heating element 203 adjacent the optical path 224 within the slider body 201 to heat the optical path 224 in order to compensate for temperature-induced change in external feedback, mitigating mode hopping/power instability of the laser diode 222.

Figure 4:
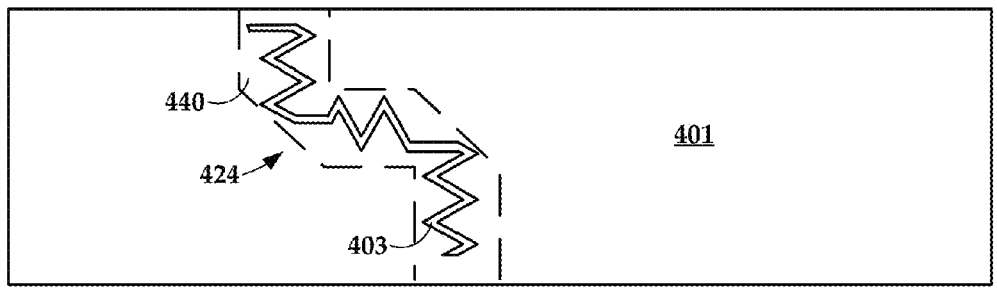
FIG. 4 is a schematic view of a portion of an optical path and a heating element according to an example embodiment.
Figure 5:
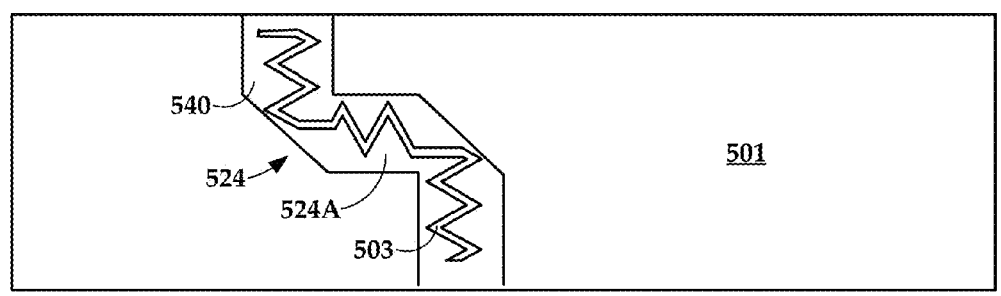
FIG. 5 is a schematic view of a portion of an optical path and a heating element according to another example embodiment.

FIGS. 4 and 5 are views of additional embodiments of a portion of the optical path 424, 524 heated by a heating element 403, 503, respectively. FIG. 4 illustrates a portion of a slider body 401 with a core 440 illustrated in phantom. The heating element 403 is disposed above the core 440 (i.e. is spaced therefrom) in a dielectric layer such as a cladding layer. As illustrated in FIG. 4, the heating element 403 can have a serpentine shape in some embodiments and can also be disposed adjacent the core 440 at distance that allows the heating element 403 to absorb some of the energy passing through the optical path 424 during lasing and be heated thereby. Thus, the heating element 403 is disposed relatively close to (or in some cases within) the core 440 to use self-heating effect in the optical path 424 to create heat that is used to heat the optical path 424. Light absorption in the optical path 424 raises the temperature, which compensates the change in optical phase due to temperature-induced emission wavelength change. A heating element may not be needed if the waveguide materials are not fully transparent.

FIG. 5 illustrates another embodiment that utilizes light absorption in the optical path 524 to raise the temperature of (i.e. create heat in) the optical path 524 within a slider body 501. In the embodiment of FIG. 5, the heating element 503 is disposed in a core 540 of the optical path 524. The heating element 503 can be comprised of a material with a higher rate of light absorption than one or more portions 524A of the optical path 524 such that the heating element 503 absorbs light energy passing through the optical path 524 and is heated thereby. Thus, in some embodiments the heating element may not be comprised of a metallic material. Also, a heating element may not be needed if the waveguide materials are not fully transparent.

Figure 6:
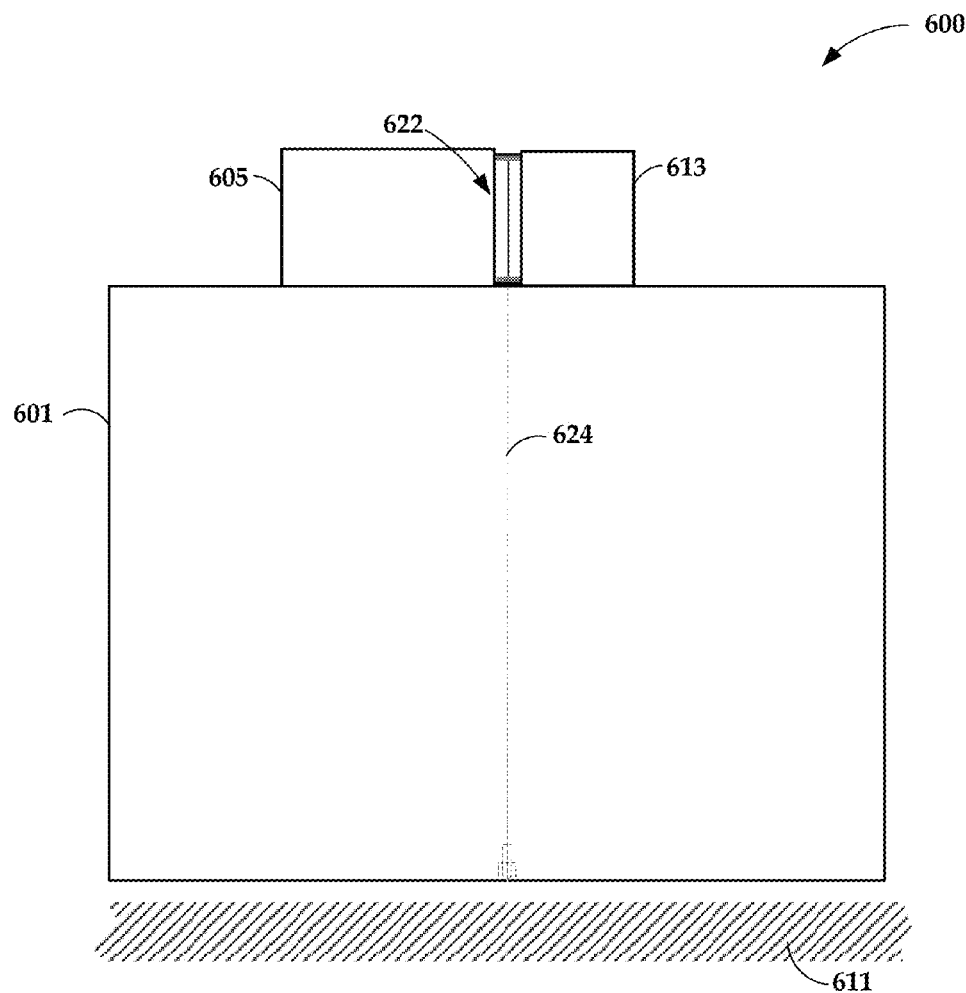
FIGS. 6 and 7 are plan views of apparatuses that include a heating and/or cooling device abutting a laser diode.
Figure 7:
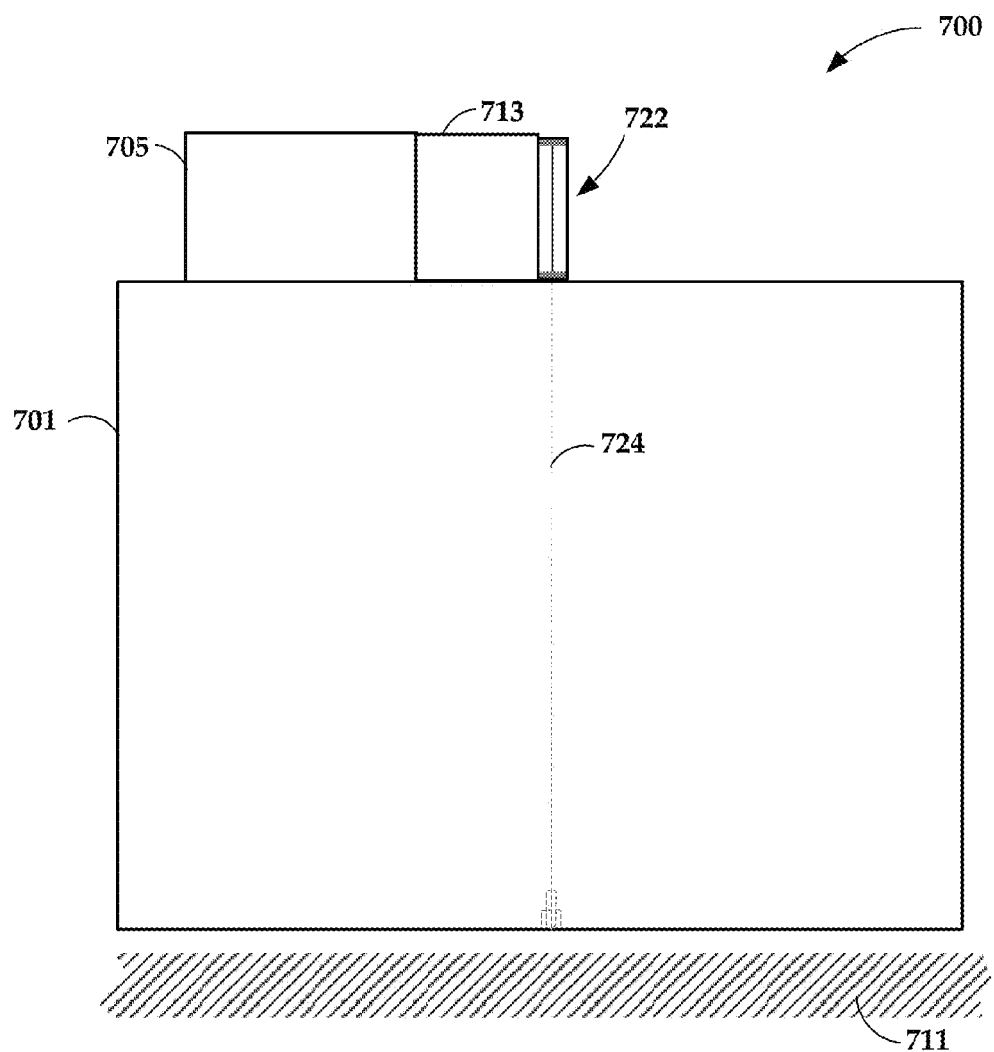

FIGS. 6 and 7 illustrate various apparatuses 600, 700 according to varying exemplary embodiments. Each apparatus 600, 700 includes a device 613, 713 that is used to heat and/or cool the laser diode as desired. This concept capitalizes on the phenomenon that if light emission wavelength does not vary during writing, the optical feedback will not change. Controlling (e.g., optimizing) the junction temperature of the laser diode (for instance, through bias current) can place the lasing mode near the valley of gain change $\Delta$G (refer to FIG. 3), thus the laser diode will be stable due to spectral hole burning effect. A side mode may also fall on one valley in $\Delta$G, but will not lase due to spectral hole burning effect in the active layer. The devices 613, 713 can comprise, for example, a heater or a thermoelectric cooler/converter (TEC) in some embodiments. The heater or TEC can be used to compensate for or cancel the temperature rise at the junction of the laser diode during HAMR.

In FIG. 6, the device 613 can be disposed at a location abutting the laser diode 622. The configuration of the laser diode 622 and the arrangement has already been described with reference to FIGS. 1B and 2. Thus, the laser diode 622 is shown disposed proximate to the slider body 601 and in some instances can be mounted thereto via a submount 605. Energy produced by the laser diode 622 during lasing is directed through the optical path 624 in the slider body 601 to heat the magnetic recording medium 611.

FIG. 7 illustrates an embodiment where the device 713 is disposed between the submount 705 and the laser diode 722. Similar to the other described embodiments, the laser diode 722 is positioned proximate to the slider body 701 such that energy produced by the laser diode 722 during lasing is directed through the optical path 724 in the slider body 701 to heat the magnetic recording medium 711.

Figure 8:
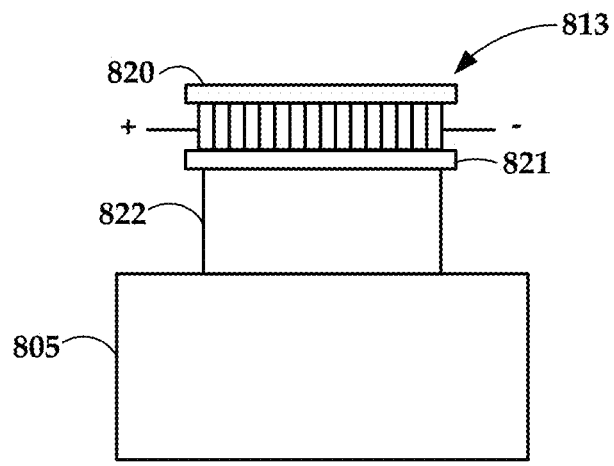
FIGS. 8-10 are schematic views of various embodiments of devices used to provide cooling and/or heating to laser diodes.
Figure 9:
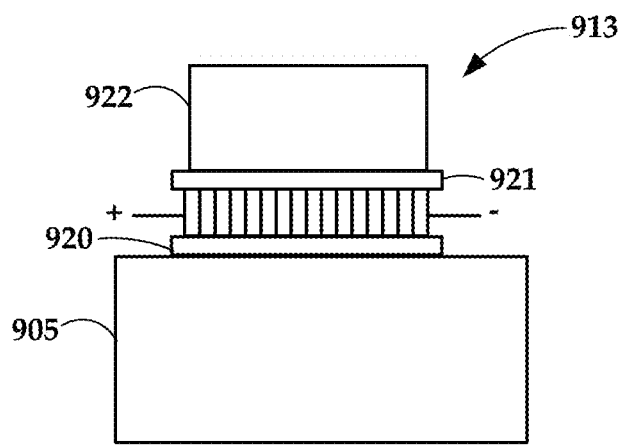
Figure 10:
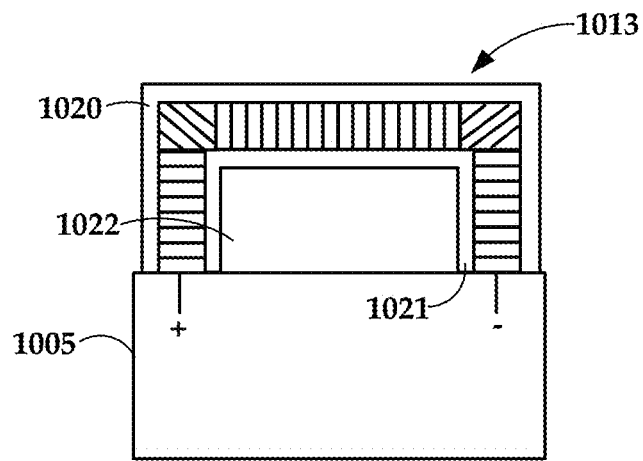

FIGS. 8-10 illustrate various configurations of a TEC device 813, 913, and 1013 according to exemplary embodiments. The TEC devices 813, 913, and 1013 can be made with functional materials (e.g., Bi$_2$Te$_3$, ScN, Ca$_3$Co$_4$O$_9$, etc.) in some cases. TEC devices utilize the Peltier effect to create a heat flux between the junction of two different types of materials. A Peltier cooler, heater, or thermoelectric heat pump is a solid-state active heat pump which transfers heat from one side of the device to the other, with consumption of electrical energy, depending on the direction of the current.

To achieve Peltier cooling, heating, etc., the TEC devices utilize two types of semiconductors, one n-type and one p-type, which have different electron densities. These are sometimes referred to as thermoelectric legs. The semiconductors are placed thermally in parallel to each other and electrically in series and are joined with a thermally conducting plate on each side. When a voltage is applied to the free ends of the two semiconductors, there is a flow of DC current across the junction of the semiconductors causing a temperature difference. The side with the cooling plate absorbs heat which is then moved to the other side of the device TEC where the heat sink is located.

The illustrated embodiments of the TEC devices 813, 913, and 1013 are connected side by side (i.e. the thermoelectric legs are stacked abutting one another) and sandwiched between two ceramic plates. FIG. 8 illustrates that the TEC device 813 can be disposed entirely on a first side (a free non-submount interfacing side) of a laser diode 822. Thus, the TEC device 813 does not abut the submount 805. FIG. 9 illustrates that the TEC device 913 can be disposed entirely on a second (submount interfacing side) of the laser diode 922. Thus, TEC device 913 has a plate that abuts a submount 905. In the embodiment of FIG. 10, the TEC device 1013 extends along multiple sides of a laser diode 1022 including the non-submount interfacing side of the laser diode 1022 and abuts portions of the submount 1005. Although not illustrated in FIGS. 8-10, in some embodiments the TEC device could extend entirely around non-lasing portions of the laser diode in a manner such that the TEC device is disposed on both the submount interfacing side and the non-submount interfacing side of the laser diode. As illustrated in all of the example embodiments, a first plate 820, 920, and 1020 comprises a heat sink that is disposed to the ambient (or submount) while the second plate 821, 921, and 1021 (comprising the cooling plate) is disposed to interface with and abut the laser diode.

Figure 11:
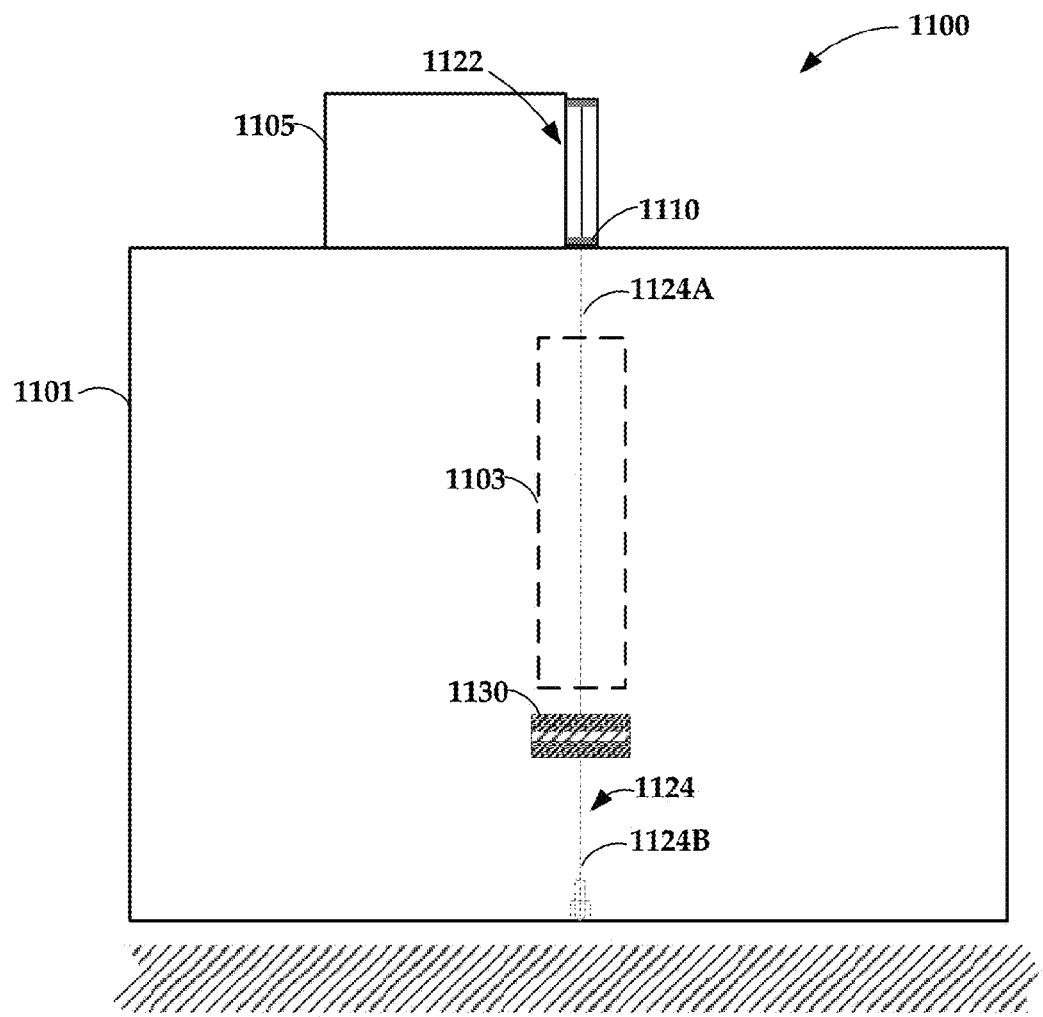
FIG. 11 is a plan view of an apparatus according to another example embodiment.

FIG. 11 illustrates another embodiment of an apparatus 1100 that has an external cavity configuration with a portion of the cavity extending within the slider body 1101. In this embodiment, a passive portion 1124A of the optical path 1124 within the slider body 1101 can be used as a cavity for lasing in addition to the laser diode 1122. In particular, a front facet 1110 can be provided with an anti-reflective coating. Additionally, the portion 1124A of the optical path 1124 extending to a Bragg reflector 1130 can be configured as a passive waveguide. Thus, the optical path 1124 includes the passive portion 1124A and an active portion 1124B. The passive portion 1124A can be constructed of material(s) having negative thermal-optical coefficient (e.g., $TiO_2$, polymers, etc.). Titanium dioxide ($TiO_2$), for example, has a thermal-optical coefficient $$\frac{dn}{dT} \approx -1.8 \times 10^{-4} K^{-1}.$$

Some types of polymer have a thermal-optical coefficient $$\frac{dn}{dT} \approx -2.4 \times 10^{-4} K^{-1}.$$

Having a portion of the optical path 1124 configured as a passive waveguide allows the passive waveguide section to compensate for or cancel the extra phase due to temperature-induced wavelength shift in the active sector. As illustrated in the embodiment of FIG. 11, a heating element 1103 can optionally be utilized in some embodiments to heat the passive portion 1124A of the optical path 1124. The construction of the heating element 1103 can be as described in reference to previous embodiments. It should be recognized that, in further embodiments, the cavity of the laser diode 1122 itself can be provided with an active portion and a passive portion constructed of material(s) having negative thermal-optical coefficient in a manner similar to the optical path 1124 discussed in reference to FIG. 11.

Figure 12:
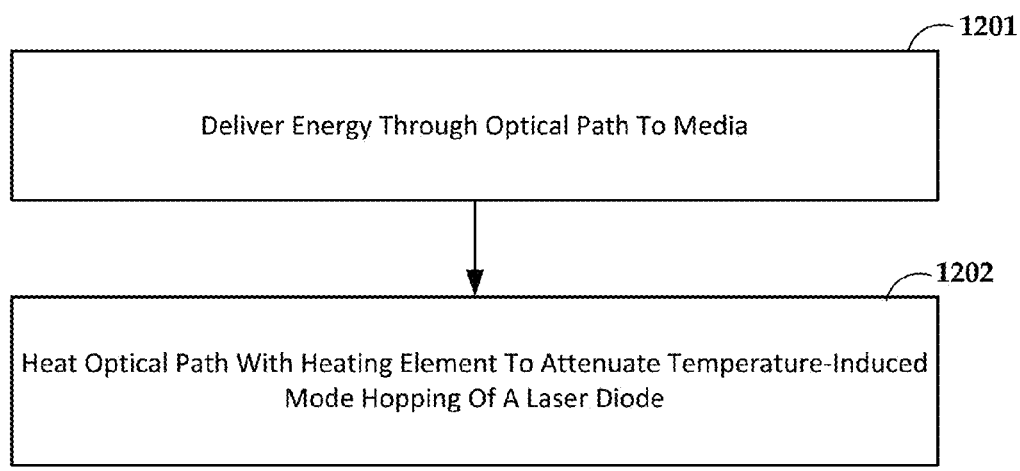
FIG. 12 is a flowchart illustrating a processes/method according to an example embodiment.

FIG. 12 is a flow diagram illustrating a method according to an exemplary embodiment. The method includes a step 1201 that delivers energy via an optical path of a slider body to heat a magnetic recording medium. The method additionally includes a step 1202 that heats the optical path with a heating element disposed along a length thereof to increase a temperature of the optical path and thereby mitigate temperature-induced mode hopping of the laser diode.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   a slider body;
   a laser diode configured to produce energy and subject to temperature changes as a result of producing energy;
   an optical path within the slider body configured to deliver the energy to heat a magnetic recording medium; and
   a heating element disposed along a length of the optical path within the slider body, the heating element configured to increase a temperature of the optical path during a majority of the time energy is delivered to the magnetic recording medium to mitigate temperature-induced mode hopping of the laser diode.

2. The apparatus of claim 1, further comprising a near field transducer in optical communication with the optical path.

3. The apparatus of claim 1, wherein the heating element comprises a metallic wire spaced apart from a core of the optical path.

4. The apparatus of claim 3, wherein the heating element comprises a resistive heater configured to receive current and produce heat therefrom.

5. The apparatus of claim 3, wherein the heating element absorbs energy passing through the optical path and is heated thereby.

6. The apparatus of claim 3, wherein the heating element is disposed in a cladding of the optical path and positioned at least one of above and below the core thereof.

7. The apparatus of claim 1, wherein the heating element is positioned in a core of the optical path and comprises a material having a rate of light absorption higher than one or more portions of the optical path, such that the heating element absorbs light energy passing through the optical path and is heated thereby.

8. The apparatus of claim 1, wherein the heating element substantially reduces power instability of the laser diode by reducing or minimizing a change in a phase of optical feedback received by the laser diode.

9. The apparatus of claim 1, wherein a write bias current applied at a start of energy production by the laser diode is selected such that a gain of laser diode power during energy production falls within a stable gain region.

10. The apparatus of claim 1, further comprising a thermoelectric cooler adjacent at least one side of the laser diode.

11. A method comprising:
    delivering energy via an optical path of a slider body to heat a magnetic recording medium; and
    heating the optical path with a heating element disposed along a length thereof during a majority of the time energy is delivered to the magnetic recording medium to increase a temperature of the optical path and thereby mitigate temperature-induced mode hopping of a laser diode.

12. The method of claim 11, wherein the heating element is disposed in a cladding of the optical path and spaced apart from a core thereof.

13. The method of claim 11, further comprising controlling heating by supplying an electric current to the heating element to produce resistive heating.

14. The method of claim 11, wherein the heating element is arranged to absorb energy passing through the optical path and be heated thereby.

15. The method of claim 11, further comprising selecting a write bias current at a start of energy production of the laser diode such that a gain of laser diode power during a lasing mode falls within a stable gain region.

16. The method of claim 11, wherein heating the optical path substantially reduces power instability of the laser diode by reducing or minimizing a change in a phase of optical feedback received by the laser diode.

17. An apparatus comprising:
- a slider body comprising an optical path configured to deliver energy to a magnetic recording medium and a near field transducer, wherein the near field transducer is in optical communication with the optical path;
- a laser diode mounted to or proximate the slider body, the laser diode configured to produce energy and subject to temperature changes as a result of producing energy; and
- a heating element disposed along the optical path within the slider body, wherein the heating element is configured to increase a temperature of the optical path during a majority of the time energy is delivered to the magnetic recording medium to mitigate temperature-induced mode hopping of the laser diode.

18. The apparatus of claim 17, wherein the heating element comprises a resistive heater configured to receive a current and produce heat therefrom.

19. The apparatus of claim 17, wherein the heating element absorbs energy passing through the optical path and is heated thereby.

20. The apparatus of claim 17, wherein the heating element is disposed in one or more of a core and a cladding of the optical path.

* * * * *